United States Patent [19]

Bowman et al.

[11] Patent Number: 5,193,257
[45] Date of Patent: Mar. 16, 1993

[54] BOILER TUBE REPAIR APPARATUS

[75] Inventors: Paul W. Bowman, Aberdeen, Ohio; Andrew F. Estill, Augusta, Ky.; Michael D. Gatherwright, Manchester; Robert L. Smith, Winchester, both of Ohio

[73] Assignee: Dayton Power and Light Company, Aberdeen, Ohio

[21] Appl. No.: 549,958

[22] Filed: Jul. 9, 1990

Related U.S. Application Data

[62] Division of Ser. No. 380,988, Jul. 17, 1989, Pat. No. 4,979,294.

[51] Int. Cl.$^5$ ............................ B23P 6/00; B23Q 39/02
[52] U.S. Cl. ............................ 29/33 T; 29/26 A
[58] Field of Search ............ 29/157.4, 402.08, 402.13, 29/426.7, 26 A, 26 B, 33 R, 33 T, 560; 83/745, 54, 485, 483; 408/72 R, 115 R, 88, 87, 97, 54, 100, 110, 111, 112, 101, 102, 137, 138, 702, 712; 51/268; 407/58; 144/251 R, 1 C, 1 R, 35, 27, 134 A; 409/185, 178, 177, 184, 134, 175, 190

[56] References Cited

U.S. PATENT DOCUMENTS

| | | | |
|---|---|---|---|
| 1,317,285 | 9/1918 | Claude | 408/97 |
| 2,193,204 | 3/1940 | Nilson | 144/27 |
| 2,196,464 | 4/1940 | Johanson . | |
| 2,348,406 | 5/1944 | Ogren | 144/27 |
| 2,395,018 | 2/1946 | Sherman | 408/702 X |
| 2,527,968 | 10/1950 | Sherman et al. | 408/112 X |
| 2,621,686 | 12/1952 | Tompkins | 144/35 X |
| 2,706,433 | 4/1955 | Mayo | 409/197 |
| 3,309,756 | 3/1967 | Segal | 407/58 X |
| 3,387,638 | 6/1968 | West | 144/1 C |
| 3,420,124 | 1/1969 | Trevathon | 408/54 |
| 3,729,808 | 5/1973 | Wolf'et al. | 407/58 X |
| 3,807,024 | 4/1974 | Harvey et al. . | |
| 3,838,722 | 10/1974 | Downing | 144/134 A X |
| 3,935,788 | 2/1976 | Gilmore . | |
| 3,962,767 | 6/1976 | Byerley et al. . | |
| 4,011,024 | 3/1977 | Nakano et al. | 408/712 X |
| 4,047,659 | 9/1977 | Vucic . | |
| 4,349,945 | 9/1982 | Fox | 144/1 R X |
| 4,443,141 | 4/1984 | Kosmowski | 409/190 X |
| 4,461,603 | 7/1984 | Klee et al. . | |
| 4,486,929 | 12/1984 | Dickhut et al. | 83/54 X |
| 4,497,353 | 2/1985 | Sprout, Jr. | 144/1 R |
| 4,515,191 | 5/1985 | Fetty | 29/560 X |
| 4,565,470 | 1/1986 | Karlsson . | |
| 4,649,608 | 3/1987 | Fresard et al. | 29/560 X |
| 4,739,688 | 4/1988 | Brennan et al. | 83/745 |
| 4,762,266 | 8/1988 | Schroder et al. . | |
| 4,844,322 | 7/1989 | Flowers et al. . | |
| 4,979,294 | 12/1990 | Bowman et al. | 29/402.08 |
| 5,033,347 | 7/1991 | Hillestad et al. | 29/402.08 X |
| 5,041,584 | 5/1991 | Kozyrski et al. | 83/464 |

FOREIGN PATENT DOCUMENTS

| | | | |
|---|---|---|---|
| 524443 | 4/1931 | Fed. Rep. of Germany | 144/27 |
| 1526994 | 12/1989 | U.S.S.R. | 144/35 |
| 2080159 | 2/1982 | United Kingdom | 29/560 |

*Primary Examiner*—William Briggs
*Attorney, Agent, or Firm*—Killworth, Gottman, Hagan & Schaeff

[57] ABSTRACT

An improved apparatus for the speedy and efficient repair of tubes contained in a furnace boiler waterwall is disclosed. Disclosed are a milling machine used to mill the elongated slots, and drill and saw fixtures to aid in cutting away the damaged tube section. The improved apparatus enhances the precision and uniformity with which boiler tube repairs may be made, increases access to perform internal welds in boiler tubes and permits some prefabrication of necessary repair parts, thus reducing furnace down time for repair.

9 Claims, 9 Drawing Sheets

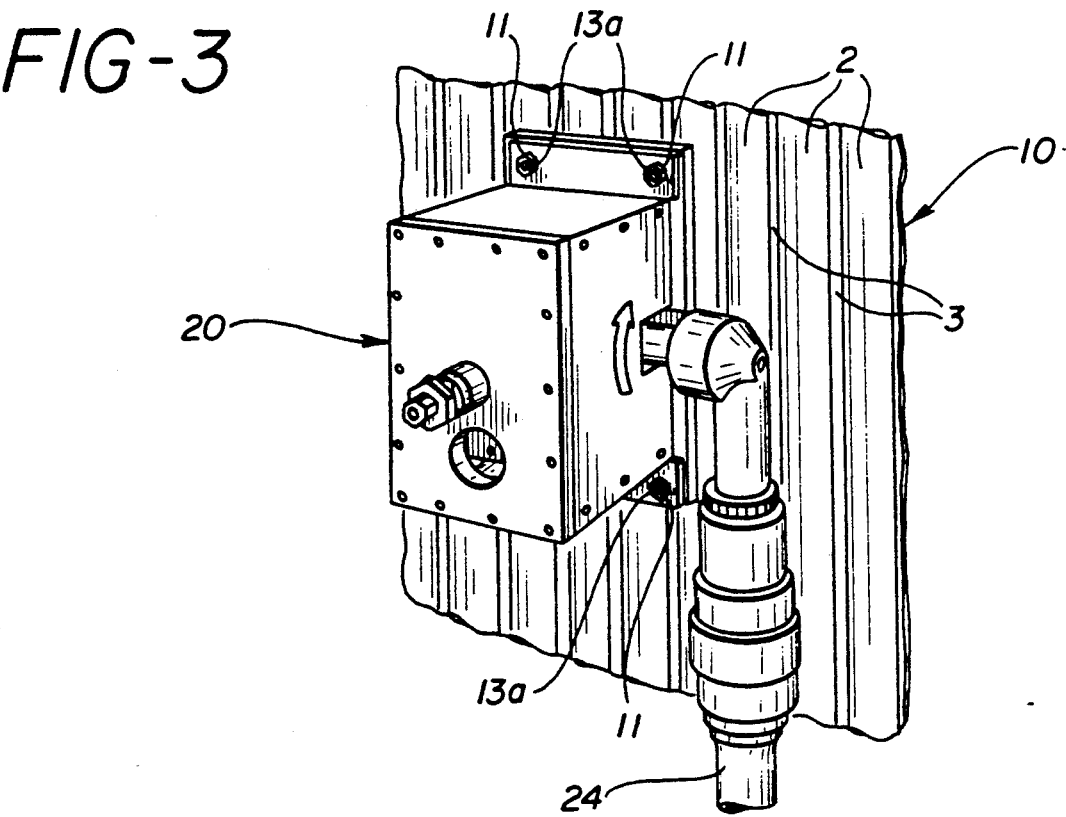
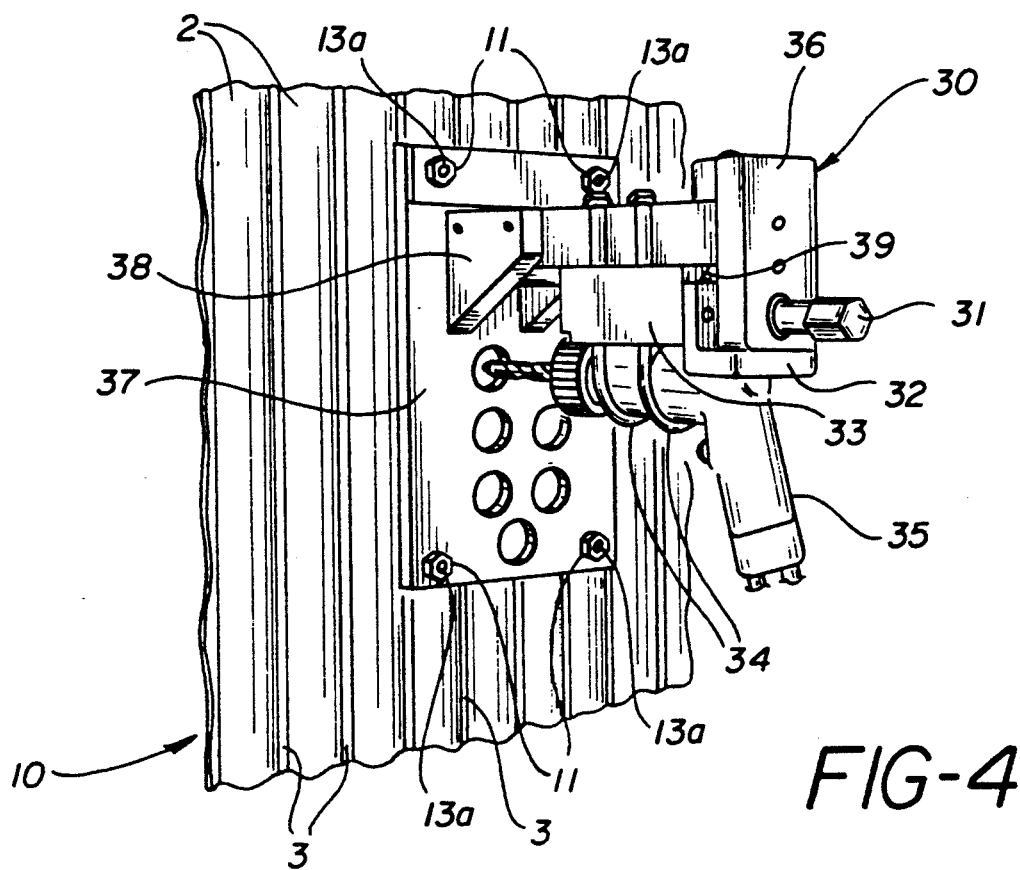

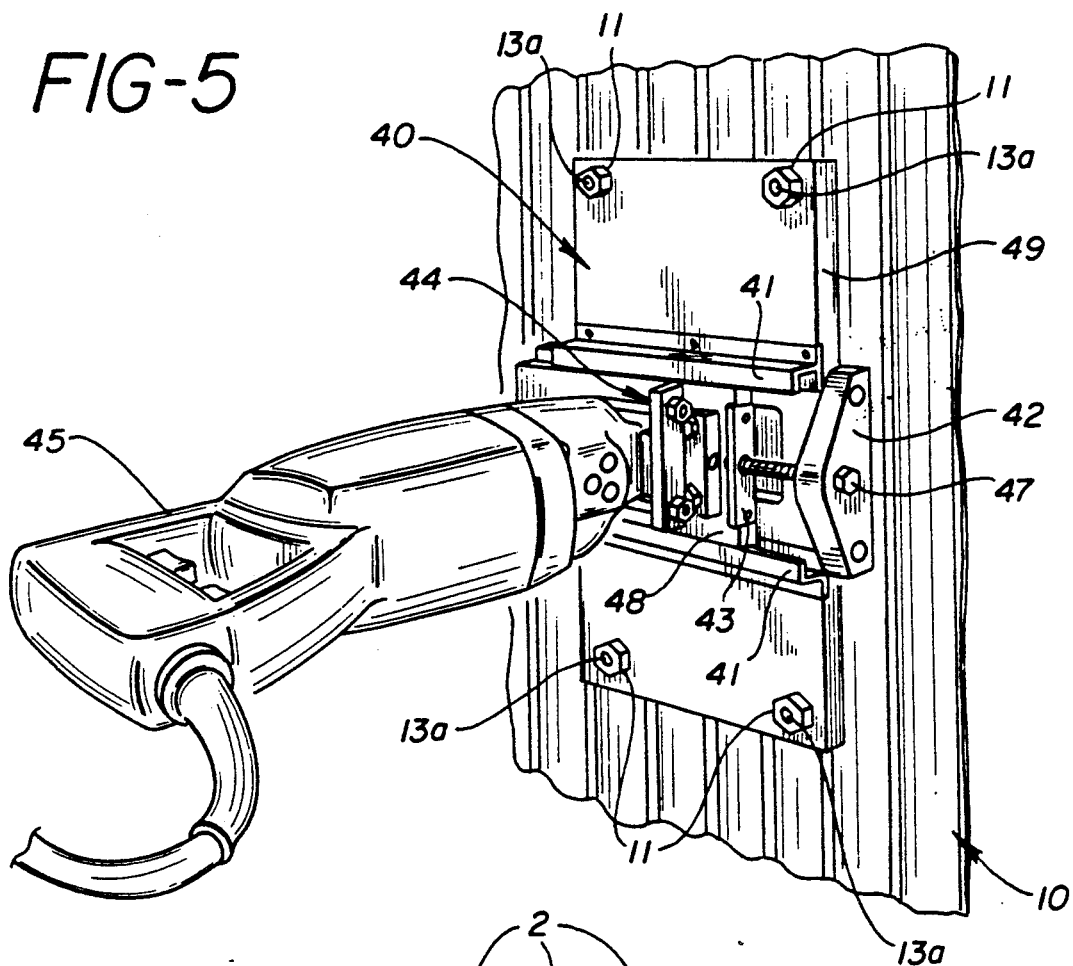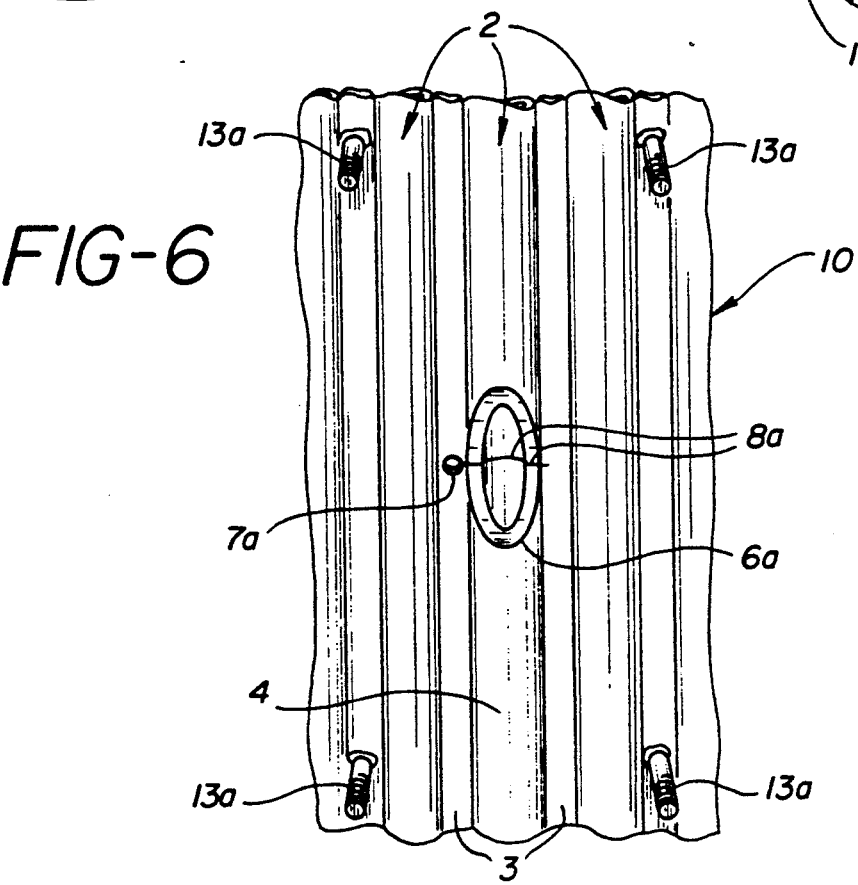

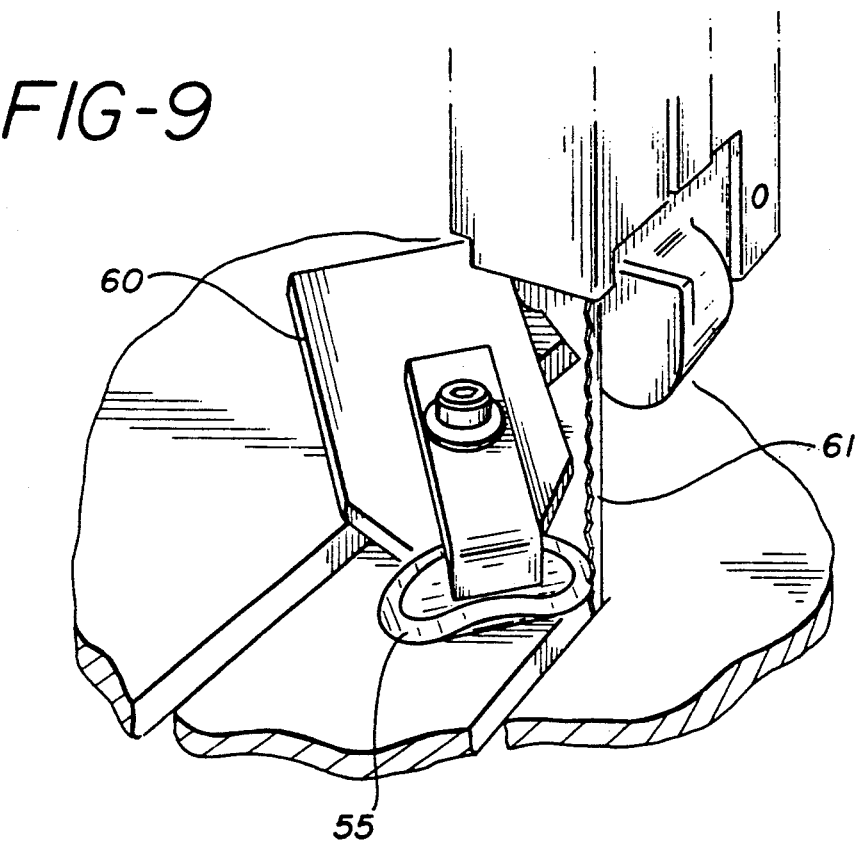
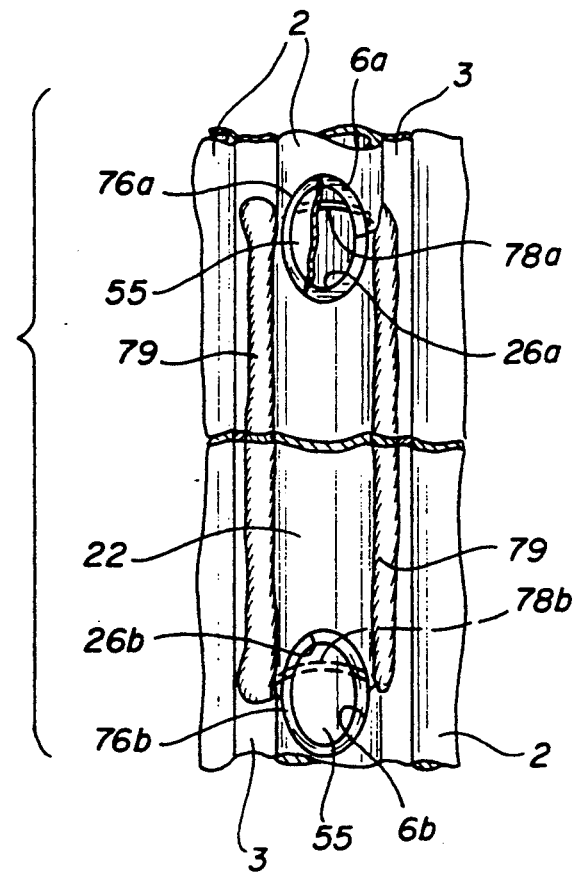

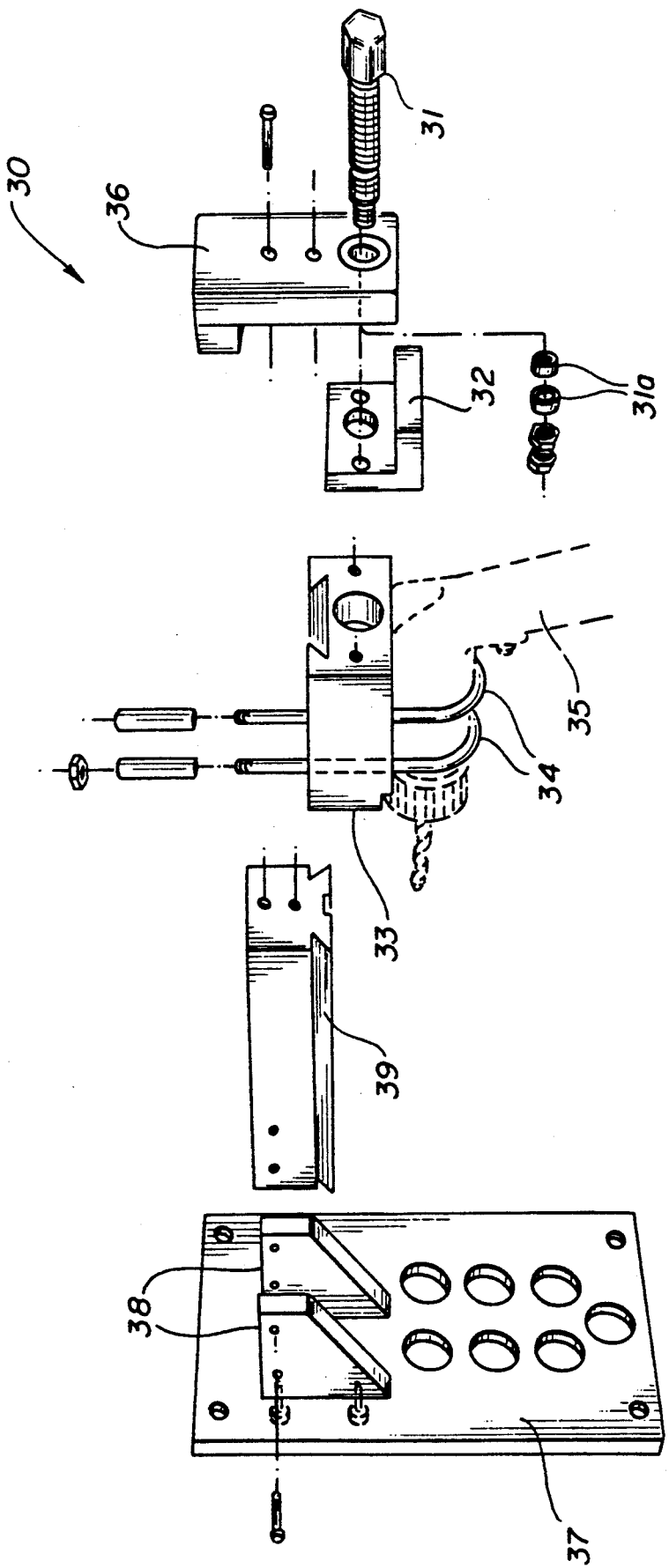

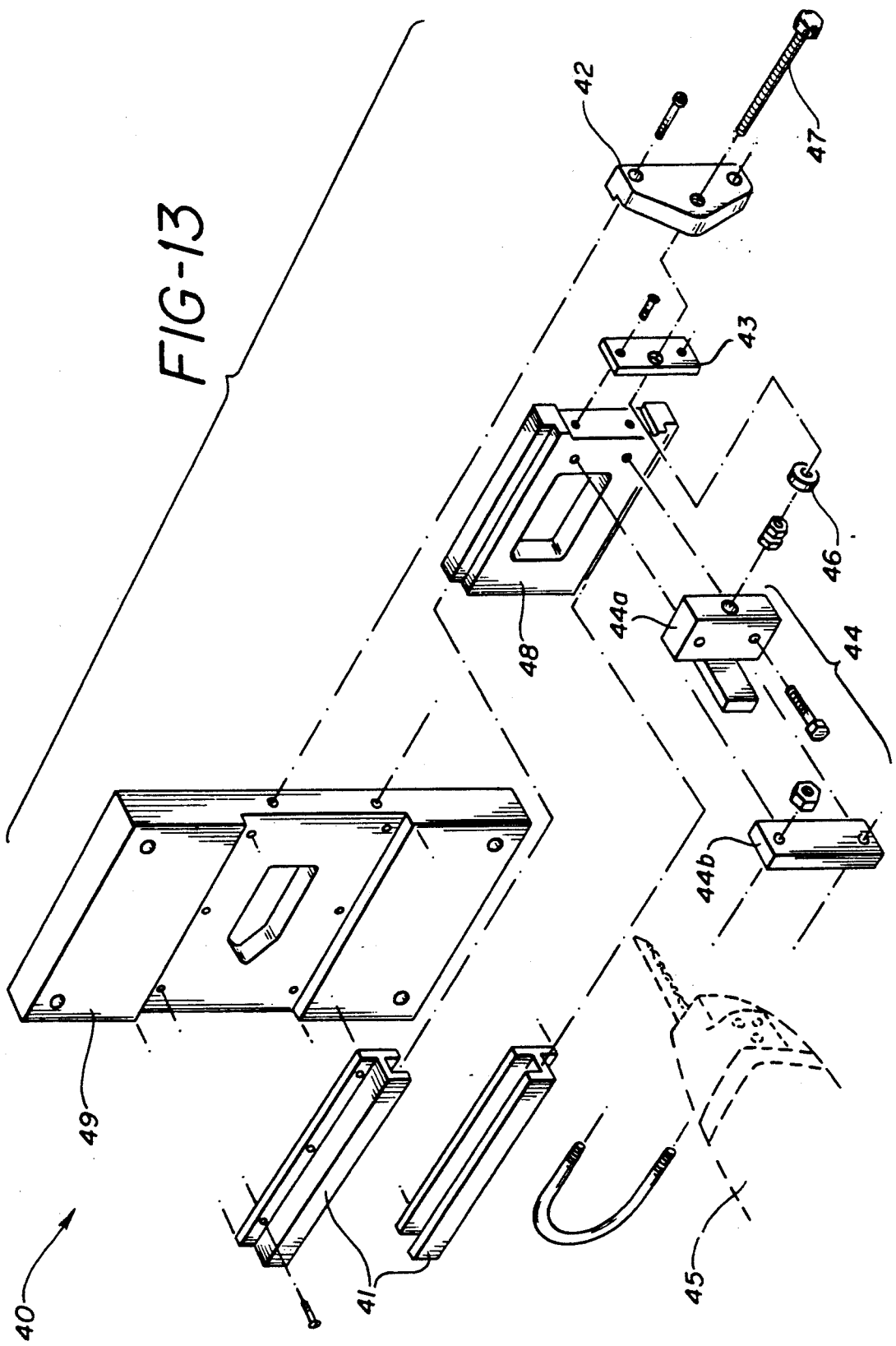

BOILER TUBE REPAIR APPARATUS

This is a division of application Ser. No. 380,988 filed Jul. 17, 1989 U.S. Pat. No. 4,979,294.

BACKGROUND OF THE INVENTION

This invention relates to the maintenance of furnace boiler water walls and, in particular, to a method and apparatus for the repair of boiler tubes in water walls.

Furnace boiler water walls are used in commercial power plants, and are typically comprised of a plurality of boiler tubes joined by web sections. As is well known, leaks eventually develop in the tubes which require repair. It is desirable to cut out the leaking, damaged sections of the tubes and replace these sections completely from outside of the boiler furnace. By eliminating the need to enter the boiler to weld sections of replacement tube in place, personnel safety is improved and boiler down time is decreased.

In prior art repair methods, once the damaged tube section and adjacent web material is cut out, welding of a section of replacement tube from outside the boiler furnace is typically accomplished through windows cut in both ends of the section of replacement tube and existing tube ends. Internal welding of the section of replacement tube to existing tubing is accomplished through these windows. Patches or covers are then welded in place to close the windows and the web section is repaired.

Vucic, U.S. Pat. No. 4,047,659 is directed to a method of repairing water carrying tubes in a gas hood for a steel, furnace. Vucic discloses tack welding a section of replacement tube in place and thereafter cutting circular windows in the assembly by means of a circular cutter. Each window is cut at the point of connection between the existing tube and section of replacement tube. Internal welding of the section of replacement tube to the existing tube is then accomplished through the windows as before, and circular covers are welded into place and the web repaired.

Vucic's method was an improvement over the prior practice of hand cutting individual square or round windows and covers. Several drawbacks in this method, however, leave further improvement desirable. The small size of the hole which results restricts access to the interior of the tubes needed to make internal welds. Further to prepare the hole for welding the cover, the edges of the circular hole must be ground by hand. As well, additional web material must be cut away to use the hole cutter according to the method disclosed by Vucic.

Thus, while the prior art methods permit repair of leaking or damaged water wall tubes from one side, for example, outside a boiler furnace improvements in technique are needed and desired to decrease furnace down time and eliminate problems with existing methods.

SUMMARY OF THE INVENTION

The present invention addresses these needs by providing an improved method and apparatus for the speedy and efficient repair of boiler tubes.

The method and apparatus of the present invention expedites the repair process by using various tools and fixtures to enhance the precision and uniformity with which boiler tube repairs may be made. As a result, the invention permits significant reduction in boiler down time to effect boiler tube repairs.

In particular, repair is expedited by using a milling machine to mill elongated slots at each end of a tube section which is to be replaced in a boiler water wall. Before or after milling, a drill and drill fixture are used to make starter holes for cutting the boiler tube at each end of the damaged section. A saw blade is then inserted in the hole and, with the aid of a drill fixture, the saw cuts the tube transversely through the midline of the elongated slots. The milling machine, drill fixture, and saw fixture are all mounted upon studs which are located by a template and welded, at the outset, to the web. Finally, the damaged tube section is removed by cutting the web along the edges of the damaged tube section. After the damaged tube section is removed, the ends of existing tubes are then beveled in preparation for installing a section of replacement tube.

The is prepared by obtaining replacement tubing in excess of the actual length needed, milling two elongated slots therein at the desired distance apart, and cutting the tube transversely through the midline of the slots to result in a replacement tube of desired length. Half of an elongated slot remains at each end, and the ends are beveled in anticipation of attachment to existing tubes by welding.

The remaining halves of elongated slots in the existing tubes and the section of replacement tube are aligned to form elongated slots and the joints between the existing tubes and section of replacement tube are welded along the inside. Access to make the welds is through the windows formed by the elongated slots.

Close fitting covers for the elongated slots are made by cutting a second section of replacement tube with a hole saw. Edges of the covers are beveled, first using a fixture with a band saw, and then grinding by hand to finish the bevel to the desired angle. A cover is then welded over each elongated slot formed by the existing tubes and the section of replacement tube, and the web is then welded along the edges of the section of replacement tube to finish the repair.

It is an object of the present invention to improve the speed at which boiler tube repairs may be made. Not only do the present method and related apparatus provide an elongated slot, enhancing access to make internal welds, the uniformity with which the slot may be milled permits the covers and at least one end of section of replacement tube to be pre-fabricated and ready when the need for repair arises. As is preferable, the use of studs to hold the milling machine and other fixtures obviates the need to cut the web excessively in order to clamp tools around the boiler tube. The use of fixtures with tools minimizes the amount of variation in window size and saw cut alignment, and thus reduces time-consuming hand work needed to fit sections of replacement tube and covers to existing tubes in effecting repairs. In addition, time-consuming hand grinding of the window is not required.

While the method and apparatus of the present invention have been described in connection with boiler tubes in a furnace boiler water wall, it is apparent to those skilled in the art that the invention will find application with heat exchangers, cooling hoods, shrouds, tube walls and the like. Further, while described and preferably practiced with the aid of various tool fixtures, the method of the present invention may be practiced by operating the machines and tools by hand or with the aid of other restraining devices.

BRIEF DESCRIPTION OF THE DRAWINGS

FIG. 3 is a perspective view of the milling machine and air drive used to mill elongated slots in boiler tubes, and shown mounted on the furnace boiler water wall.

FIG. 4 is a perspective view of the drill and fixture used to make a starting-hole for cutting the boiler tube.

FIG. 5 is a perspective view of the saw and fixture used to cut the boiler tubes.

FIG. 6 is a front elevational view of the mounting studs and cuts made by milling, drilling and sawing.

FIG. 9 is a perspective view of the cover and fixture used with a saw to bevel the cover edge.

FIG. 10 is a perspective view of a repaired boiler tube in a water wall.

FIG. 12 is exploded view of the drill fixture.

FIG. 13 is exploded view of the saw fixture.

DETAILED DESCRIPTION OF THE PREFERRED EMBODIMENT

Figure 1:
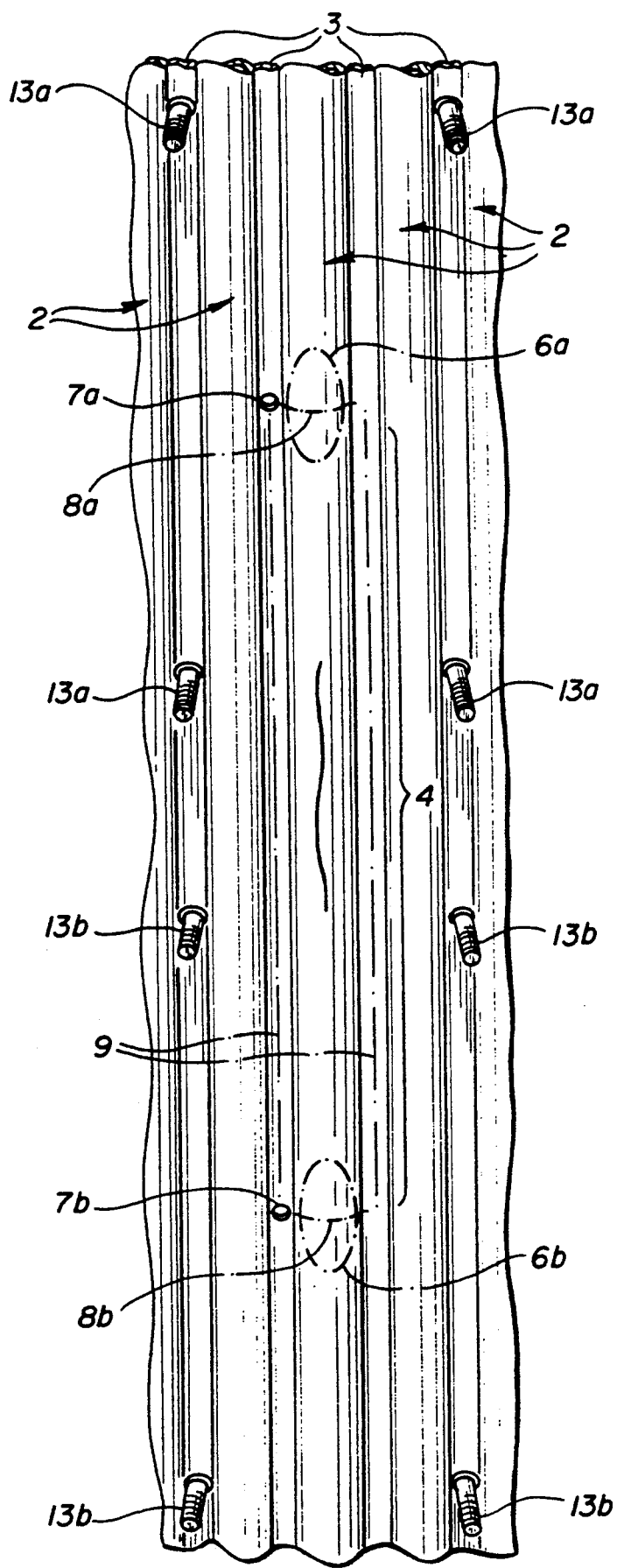
FIG. 1 is a perspective view of a leaking or damaged tube section showing the various cuts made at each end of the tube section to be replaced.
Figure 2:
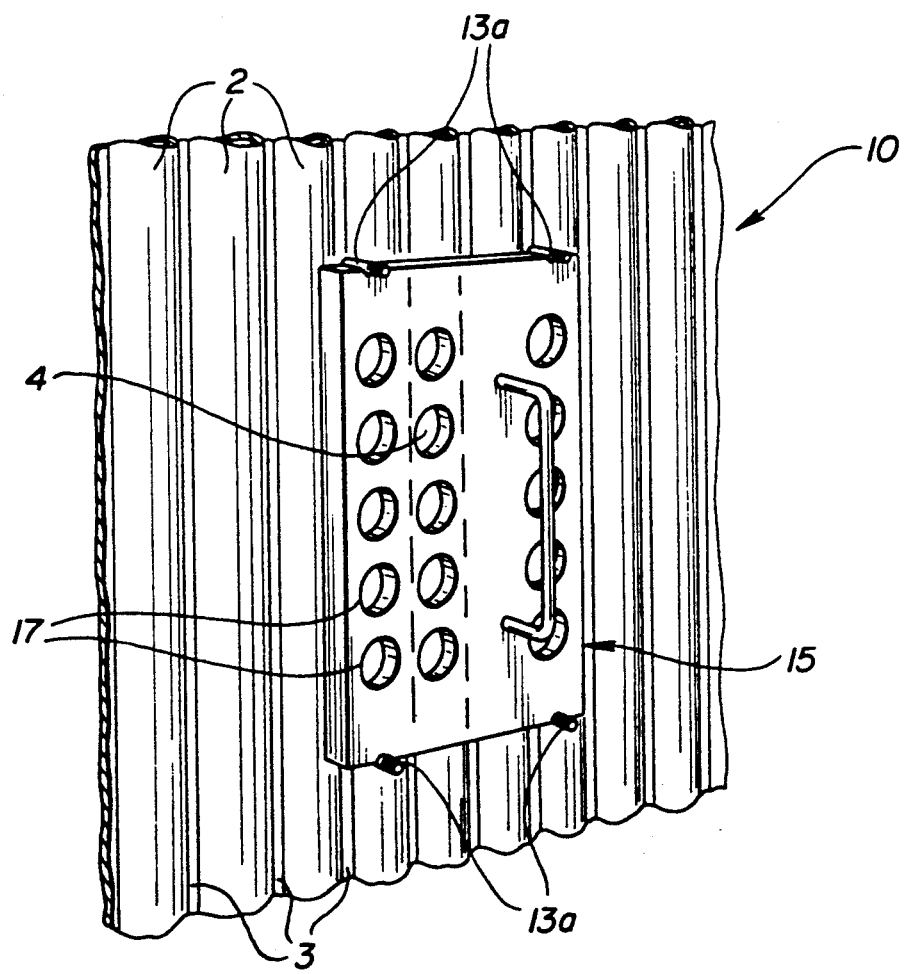
FIG. 2 is a perspective view of a furnace boiler water wall showing the use of a template to locate mounting studs.

Referring to FIG. 2, a furnace boiler water wall 10 consisting of tubes 2 joined by webs 3 is shown. While the machines used practice the method disclosed in detail below may be hand-held or controlled in a number of ways known in the art, the preferred embodiment employs mounting studs 13a and 13b, shown typically in FIG. 1, welded at either end of damaged tube section 4 which permit the use of fixtures to control machine operation.

FIG. 2 shows the use of a template 15 to locate mounting studs 13a on water wall 10 at one end of damaged tube section 4. The second set of mounting studs 13b are similarly located by the template 15 at the other end of the damaged tube section 4. Holes 17 shown in template 15 are for weight reduction. Once welded in place, mounting studs 13a and 13b are used to hold various fixtures and machines in place as shown in FIGS. 3-5.

Accordingly, FIG. 3 shows milling machine 20 typically mounted on mounting studs 13a and held in place by conventional means such as nuts 11. As further shown in FIGS. 7 and 11, milling cutter 21 is preferably a stagger-toothed cutter as is known in the art, preferably having a width equal to the outer diameter of tube 2 and having a diameter larger than the outer diameter of tube 2, preferably 3.5 to 4.0 times larger. Milling cutters of various design and dimension, however, may be used in milling machine 20, and can be effective in practicing the method disclosed. An air driver 24 attached to shaft 25 turns milling cutter 21 which mills an elongated slot in tube 2 to a desired depth, preferably half way through tube 2. Milling machine 20 is then removed and the operation repeated at the other end of damaged tube section 4.

As shown typically in FIG. 4, drill fixture 30 is mounted to water wall 10 on mounting studs 13a and attached by conventional means, such as nuts 11. Drill 35 is attached by bolts 34 to guide 33 which slides on track 39 of drill fixture 30. As may also be seen in FIG. 4, drill 35 is a hand-held, portable, power drill. Drill 35 is removably mounted with bolts 34, as shown, and is adapted for connection to a power source. Drill fixture 30 is preferably made of magnesium or aluminum for light weight. In accordance with the method disclosed herein, drill 35 is brought into contact with web 3 at points adjacent to the midline of elongated slots 6a and 6b to make apertures 7a and 7b, respectively. See FIGS. 1 and 6. Apertures 7a and 7b which result serve as starting holes for saw cuts 8a and 8b shown in FIG. 1. The drilling of apertures 7a and 7b may be performed before or after the milling of elongated slots 6a and 6b.

The next step in the present method is preferably performed as shown in FIG. 5, where saw fixture 40, preferably made of aluminum for light weight, is shown typically mounted on mounting studs 13a and secured by conventional means such as nuts 11. Saw 45, attached to support bracket 44 by conventional means and mounted on guide 48, slides along track 41 to cut tube 2 transversely across the midline of the elongated slot 6a. This operation is repeated at the other end of damaged tube section 4.

The result of milling, drilling and cutting on both ends of damaged tube section 4 is shown in FIGS. 1 and 6. The damaged tube section 4 is finally removed from water wall 10 by cutting web 3 longitudinally along the edges of damaged tube section 4, preferably by using a torch. The ends of existing tubes 2 are then beveled as is commonly known in the art, preferably by grinding with a die grinding, in preparation for welding replacement tube 22 in place. (See FIG. 10).

Figure 7:
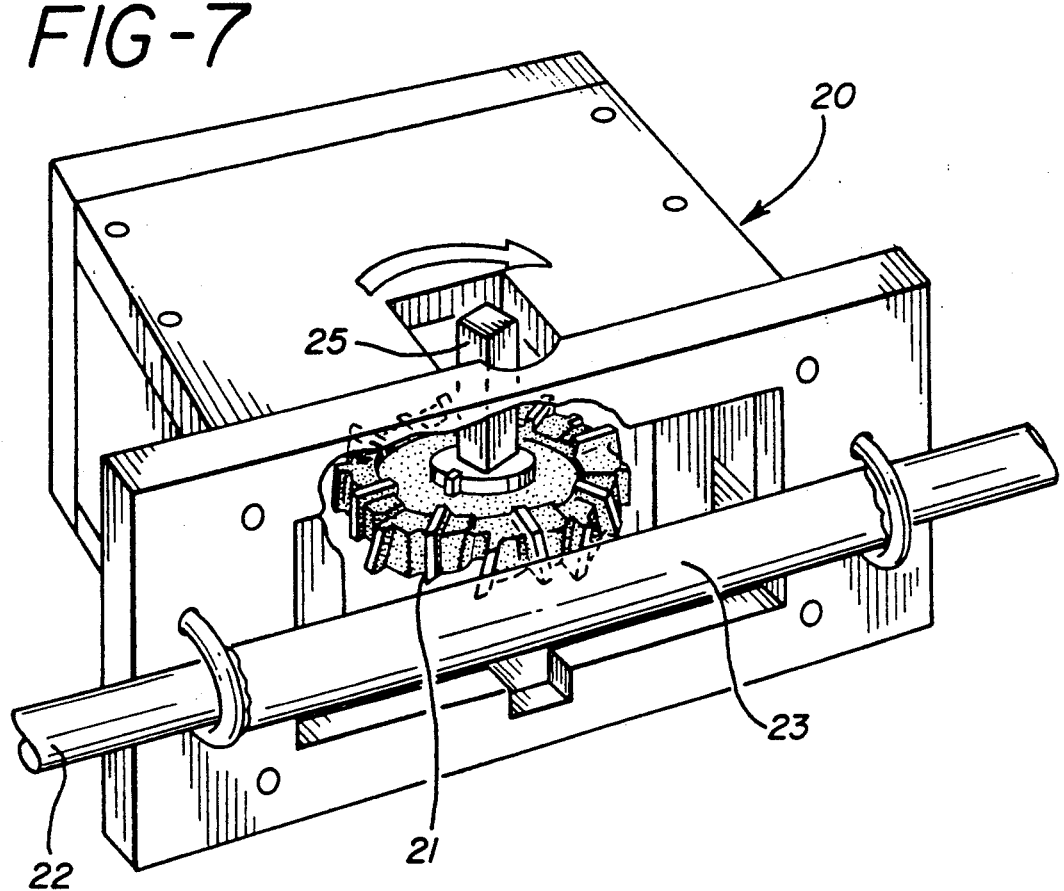
FIG. 7 is a perspective view of the milling machine and replacement tube fixture used to mill elongated slots in replacement tubing.

The method for preparing a length of tube for replacing damaged tube section 4 begins with obtaining a section of replacement tubing 22 in excess of the actual length required. As shown in FIG. 7, the replacement tube 22 is clamped to milling machine 20 with milling machine fixture 23. Replacement tube 22 is then typically clamped in a vise (not shown) or similarly restrained. Air drive 24 (shown in FIG. 3) is attached to shaft 25 (shown in FIG. 7) to rotate milling gear 21 of milling machine 20 as in FIG. 3. A first elongated slot 26a (shown in FIG. 10) is then milled in replacement tube 22 to the desired depth, preferably half way through replacement tube 22. A second elongated slot 26b (not shown) is milled in replacement tube 22 at the desired distance from the first elongated slot 26a so that when elongated slots 26a and 26b are cut transversely at approximately their midlines, a replacement tube 22 of the desired length is obtained. After cutting, the ends of replacement tube 22 are then beveled as is known in the art in preparation for attachment by welding to existing tubes 2.

With reference to FIG. 10, replacement tube 22 may now be attached to tubes 2 and water wall 10 by aligning the remainder of elongated slots 26a and 26b in replacement tube 22 with the remainder of elongated slots 6a and 6b in tubes 2. Interior welds 78a and 78b are then made at the joints between tubes 2 and 22 through the elongated slots formed by the remainder of slots 6a and 26a, and 6b and 26b.

Figure 8:
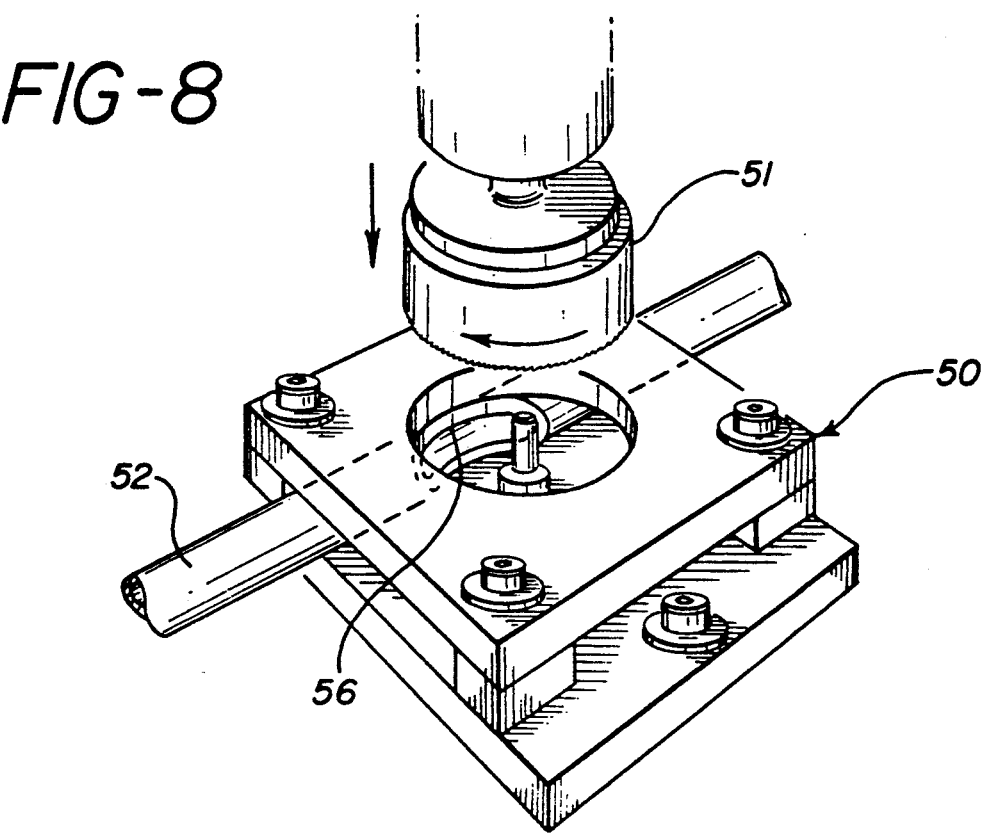
FIG. 8 is a perspective view of a hole saw and fixture used to cut covers for the elongated slots.

Covers 55 for closing the elongated slots thus formed in water wall 10 are cut from a second section of replacement tubing, 52 as shown in FIG. 8. Replacement tube 52, held in hole saw fixture 50, is cut by hole saw 51. Hole saw 51 preferably has a diameter equal that of milling gear 21, so that cutting replacement tube 52 to its center line, as is preferable, results in a cover 55 of desired shape and size, as shown in FIG. 9.

The edges of covers 55 are beveled as shown in FIG. 9 in anticipation of welding. Fixture 60 is used to hold cover 55 which is beveled along its circumference by saw 61. Additional hand grinding, as is known in the art, is preferred to increase the beveled angle on the circumference of covers 55. Covers 55 are then placed over the elongated slots formed in water wall 10 and attached, preferably by seal welds 76a and 76b, as shown in FIG. 10.

Finally, web 3 is attached along lines 79 to replacement tube 22, preferably by welding.

Figure 11:
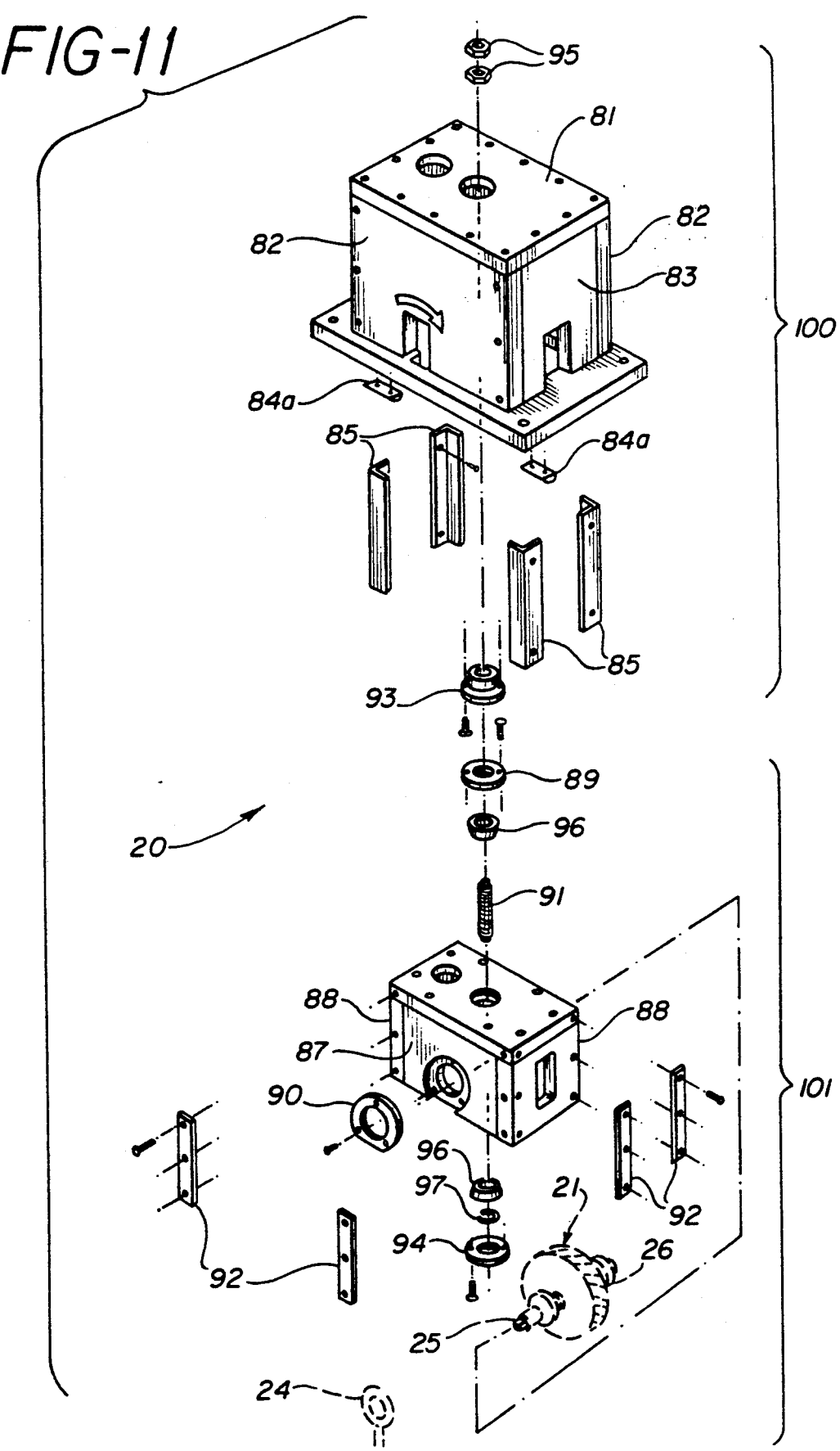
FIG. 11 is an exploded view of the milling machine.

Milling machine 20 is shown in greater detail in the exploded view of FIG. 11. Milling cutter 21 is shown mounted on shaft 25 inside support assembly 101 and is supported by bearings 26 and rings 90. Assembly 101 is slidably inserted into housing assembly 100. Assembly 101 is connected to housing assembly 100 by threaded rod 91. At its first end, threaded rod 91 is rotatably inserted into top plate 86 and ring 89. Bearings 96 are fitted on this first end and maintained by conventional means such as snap ring 97 and ring 94. The position of assembly 101 inside housing assembly 100 is controlled by turning threaded rod 91 at its second end. Rotational motion of rod 91 is translated into linear motion by threaded bushing 93 which is mounted to top plate 81 of housing assembly 100. Lock nuts 95 which are used to turn threaded rod 91 manually at its second end, also serve as an adjustable stop for the downward travel of milling cutter 21. Commercially available screws, bolts and bearings are shown and used in a manner known in the art.

Referring to FIG. 12, the drill fixture 30 is shown in greater detail. Various components such as brackets 38 and 32, plates 36 and 37 guide 33 and track 39 are preferably made of aluminum or magnesium for light weight. Additionally, holes are made in plate 37 to further reduce weight of the fixture. Linear motion of drill 35 and guide 33 along track 39 is controlled with bolt 31. Bolt 31, which is threaded, passes first through a threaded hole in plate 36 and then through a hole in bracket 32. The end of bolt 31 is then rotatably inserted into bearings 31a which are held thereon by conventional means, and the bearings and bolt end are nested inside guide 33.

Finally, saw fixture 40 is shown in greater detail in FIG. 13. Again, various parts shown are preferably made of aluminum and are joined by conventional means. The movement of saw 45, support bracket 44 and guide 48 in track 41 is controlled with bolt 47. Bolt 47, which is threaded, passes through a threaded hole in plate 42 and then through a hole in plate 43. The end of bolt 47 is rotatably inserted into bearing 46 which is held thereon by conventional means, and the bearing and end are nested in support bracket 44.

While certain representative embodiments and details have been shown and described for purposes of illustrating the invention, it will be apparent to those skilled in the art that various changes of the methods and apparatus disclosed herein may be made, and that the method, preferably practiced with the aid of fixtures such as those disclosed herein, may be practiced manually or otherwise with other fixtures without departing from the scope of the invention which is defined in the appended claims.

What is claimed is:

1. A system for removing tube sections in boiler water walls comprising:
    a plurality of mounting studs for attachment to a boiler water wall;
    a template for aligning said plurality of mounting studs on a boiler water wall in a pattern;
    a milling machine for milling elongated slots in boiler tube sections of boiler water walls, said milling machine including means for mounting said milling machine on ones of said plurality of mounting studs, whereby said milling machine may be secured on said mounting studs for operation;
    a drill and drill fixture for drilling apertures in boiler water walls, said drill mounted on said drill fixture, and said drill fixture including means for mounting said drill fixture on one of said plurality of mounting studs, whereby said drill fixture may be secured on said mounting studs for operation of said drill; and
    a saw and saw fixture for sawing boiler water walls between apertures drilled therein, said saw mounted on said saw fixture, and said saw fixture including means for mounting said saw fixture on ones of said plurality of mounting studs, whereby said saw fixture may be secured on said mounting studs for operation of said saw; and
    wherein said milling machine, said drill fixture, and said saw fixture each include a like pattern of holes to receive said mounting studs attached to said boiler water wall in said like pattern.

2. A system as recited in claim 1 wherein said milling machine comprises:
    a housing assembly;
    a support assembly slidably disposed in said housing assembly;
    a milling cutter for milling apertures as elongated slots in a tube, said milling cutter rotatably disposed in said support assembly, said milling cutter comprising a rotatable wheel including peripheral cutting surfaces having a total width greater than the inner diameter of said tube to mill outward facing surfaces in said tube around said apertures; and
    means for forcibly sliding said milling cutter support assembly in said housing assembly; and
    means for rotating said milling cutter.

3. An apparatus as recited in claim 2 wherein said rotatable wheel including peripheral cutting surfaces is a stagger-toothed cutter having a total width substantially equal to the outside diameter of a tube to be milled.

4. An apparatus as recited in claim 2 wherein said rotatable wheel including peripheral cutting surfaces is a stagger-toothed cutter having a diameter of substantially 3.5 to 4.0 times the outside diameter of a tube to be milled.

5. A system as defined in claim 1 wherein said drill fixture comprises:
    a plate having one or more openings for drilling, said plate adapted to be removably secured to a boiler water wall;
    a track having a first end and a second end, said track attached to said plate near said second end and extending outward from said plate at an angle thereto;
    a guide slidably disposed in said track;
    means for forcibly sliding said guide on said track; and a portable drill removably mounted on said guide;

whereby said drill may be slid along said guide to forcibly contact a boiler water wall for drilling apertures therein.

6. A system for preparing tube sections in boiler water walls for removal, said system including:

a plurality of mounting studs for attachment to a boiler water wall;

a template for aligning said plurality of mounting studs on a boiler water wall in a pattern;

a milling machine for milling elongated slots in boiler tube sections of boiler water walls, said milling machine including means for mounting said milling machine on ones of said plurality of mounting studs, whereby said milling machine may be secured on said mounting studs for operation; and a drill and drill fixture for drilling apertures in boiler water walls, said drill mounted on said drill fixture, and said drill fixture including means for mounting said drill fixture on ones of said plurality of mounting studs, whereby said drill fixture may be secured on said mounting studs for operation of said drill; and wherein said milling machine and said drill fixture each include a like pattern of holes to receive said mounting studs attached to said boiler water wall in said like pattern.

7. A system as recited in claim 6 wherein said milling machine comprises:

a housing assembly;

a support assembly slidably disposed in said housing assembly;

a milling cutter for milling apertures as elongated slots in a section of replacement tube, said milling cuter rotatably disposed in said support assembly, said milling cuter comprising a rotatable wheel including peripheral cutting surfaces having a total width greater than the inner diameter of said tube to mill outward facing surfaces around said apertures;

means for forcibly sliding said milling cutter support assembly in said housing assembly; and means for rotating said milling cutter.

8. A system as recited in claim 6 wherein said drill fixture comprises:

a plate having one or more openings for drilling, said plate adapted to be removably secured to a boiler water wall;

a track having a first end and a second end, said track attached to said plate near said second end and extending outward from said plate at an angle thereto;

a guide slidably disposed in said track;

means for forcibly sliding said guide on said track; and a portable drill removably mounted on said guide;

whereby said drill may be slid along said guide to forcibly contact a boiler water wall for drilling apertures therein.

9. The system of claim 7 wherein said peripheral cutting surfaces have a total width approximately equal to the outer diameter of said tubes.

* * * * *

UNITED STATES PATENT AND TRADEMARK OFFICE
CERTIFICATE OF CORRECTION

PATENT NO. : 5,193,257
DATED : March 16, 1993
INVENTOR(S) : Bowman et al.

It is certified that error appears in the above-identified patent and that said Letters Patent is hereby corrected as shown below:

Col. 6, Line 57, "as defined in" should be
--as recited in--.

Col. 8, Line 5, "said milling cuter" should be
--said milling cutter--.

Col. 8, Line 6, "said milling cuter" should be
--said milling cutter--.

Signed and Sealed this

Thirtieth Day of November, 1993

Attest:

BRUCE LEHMAN

Attesting Officer

Commissioner of Patents and Trademarks